United States Patent Office 3,583,964
Patented June 8, 1971

3,583,964
PROCESS FOR THE POLYMERIZATION OF VINYL CHLORIDE
Sergio Lo Monaco and Corrado Mazzolini, Mestre, and Luigi Patron and Alberto Moretti, Venice, Italy, assignors to Chatillon Società Anonima Italiana per le Fibre Tessili Artificiali S.p.A., Milan, Italy
No Drawing. Filed Sept. 28, 1967, Ser. No. 671,216
Claims priority, application Italy, Sept. 24, 1966, 22,791/66, 22,792/66; Apr. 13, 1967, 14,908/67
Int. Cl. C08f 3/30, 15/26, 1/04
U.S. Cl. 260—92.8     12 Claims

ABSTRACT OF THE DISCLOSURE

A process for the bulk polymerization of vinyl chloride at temperature below 0° C. (preferably from −10° C. to −70° C.) in the presence of a catalytic system consisting of: (1) an organic hydroperoxide of the general formula R—O—O—H wherein R is a linear or branched chain alkyl radical, a cycloalkyl radical, an aryl radical or an alkyl-aryl radical; (preferably cumene hydroperoxide and tert. butyl hydroperoxide) (2) sulphur dioxide, and (3) at least one alcoholate of the formula $(R-O)_n Me$ wherein R is an alkyl radical with a linear or branched chain having from 1 to 6 carbon atoms (preferably from 1 to 3 carbon atoms, Me is a metal of the first or second group of the Periodic System or aluminium and $n$ may be 1, 2 or 3 depending on the valency of Me. The molar ratio $(RO-)/SO_2$ does not exceed 2 and is typically comprised between 0.70 and 1.8 and preferably between 0.85 and 1.5.

Polyvinyl chloride exhibiting a degree of syndiotacticity exceeding 1.8, a Tg value exceeding 95° C., colour characteristics of purity index of at least 97 and of brightness of at least 90, heat-sensitivity of a purity index variation lower than 5 and of a brightness variation lower than 20, and at least one monovalent sulphonic end group per chain (particularly from one to two).

BACKGROUND OF THE INVENTION

This invention relates to a process for the low temperature bulk-polymerization of vinyl chloride and to highly syndiotactic polyvinyl chloride thus obtained.

It is known that the low temperature polymerization of vinyl chloride results in the formation of polyvinyl chloride which exhibits a degree of syndiotacticity exceeding 1.8, a glass transition temperature (Tg) exceeding 95° C. and a higher softening temperature than the polyvinylchloride obtained at a higher polymerization temperature. Such polyvinyl chloride, usually called highly syndiotactic polyvinyl chloride, is particularly suitable to be transformed into fibres having excellent physical, mechanical and chemical characteristics and in particular an excellent dimensional stability both in boiling water, as well as in air at higher temperature and in solvents used in dry cleaning within the temperature limits of the normal practical use of such solvents.

The degree of syndiotacticity, as understood herein, is determined in the manner disclosed by Fordham, Burleigh and Strum in Polymer Sci., vol. XLI (1959), pages 73–82.

The glass-transition temperature (Tg) is determined in the manner described in J. Polymer Sci., vol. 56 (1962), pages 225–231, from which it will also be seen that the Tg-value of a conventional polyvinyl chloride is about 78° C.

The low temperature polymerization of vinyl chloride, practically, involves serious difficulties as far as the polymerization process and the catalyst are concerned.

In fact, the only polymerization process which can be easily carried out at low temperature is the bulk-polymerization, because the other known polymerization processes, that is emulsion or solution process, involve many inconveniences such as the choice of a suitable solvent or emulsifying agent, the necessity to use voluminous equipment and great volumes of reacting compounds for obtaining an industrially interesting productivity, high costs for bringing the polymerization mixture down to a low temperature, etc.

As to the catalyst, the usual polymerization initiators like organic peroxides, azo-bis-isobutyro-nitrile, persulphates, etc. are ineffective in the low temperature polymerization of vinyl chloride, because they are stable and do not produce the free radicals required to start polymerization.

It is known that the Redox catalyst system constituted by an organic hydroperoxide and sulphur dioxide is capable to form free radicals and to start the low temperature polymerization of sulphur dioxide with organic compounds having olefinic unsaturation or the solution or the solution polymerization of acrylonitrile.

However, it is proved that such Redox catalyst system is ineffective in the low temperature bulk-polymerization of the vinyl chloride. In fact, it is proved that, when vinyl chloride as reaction medium is used, the sulphur dioxide catalyzes the acid decomposition of the hydroperoxide without the free radical formation; such as, for example, cumene hydroperoxide in vinyl chloride monomer at −30° C., is quantitatively and nearly immediately decomposed in acetone and phenol, while the sulphur dioxide remains unvaried.

The only catalysts which so far have proved efficient in starting the bulk-polymerization of the vinyl chloride at low temperature are the organo-metal compounds, such as alkyl-zinc, alkyl-cadmium, alkyl-aluminum, alkyl-boron and the like, in association with molecular oxygen or with oxidizing substances.

However, the use of such catalysts gives rise in practice to several drawbacks. For example, such catalysts are self-inflammable when in contact with air, they are difficult to synthesize and are very instable. Furthermore they are very oxygen sensitive inasmuch as slightest oxygen traces, not checked during the polymerization, cause great variations in the polymerization conversion and in the viscosity of the polymer.

Furthermore, the decomposition products of said catalysts, at room temperature or at higher temperature, prove to be still excellent polymerization initiators; consequently the unreacted recovered monomers, containing the decomposition products of said catalyst, tend to polymerize during their recovery and storage. Therefore the problem arises of completely eliminating from the unreacted monomers those decomposition products.

A primary object of this invention is, therefore, to provide an advantageous and reliable process for low temperature bulk-polymerization of vinyl chloride, in which the above recalled drawbacks are avoided.

THE INVENTION

It has been surprisingly found that such drawbacks can be avoided by bulk-polymerization, at a temperature below 0° C., of vinyl chloride in the presence of a catalytic system consisting of an organic hydroperoxide, sulphur dioxide and at least one alcoholate of the general formula $(R-O)_n Me$ wherein R is an alkyl radical with a linear or branched chain having from 1 to 6 carbon atoms, "Me" is a metal of the first or second group of the Periodic System or aluminium and $n$ may be 1, 2 or 3, depending on the valency of Me, in which the $(RO-)/SO_2$ molar ratio does not exceed 2 and is typically comprised between 0.70 and 1.8 and preferably between 0.85 and 1.5.

It is pointed out that the strongly effective free radical polymerization initiators which start the low temperaure bulk-polymerization of vinyl chloride are produced by the co-operation of the above cited three compounds of the catalytic system, that is an organic hydroperoxide, sulphur dioxide and an alcoholate. The simultaneous presence of these three compounds, therefore, is essential for carrying out the polymerization in so far as in the case that one of the three compounds is missing no polymerization would take place.

The polyvinyl chloride thus obtained exhibits a degree of syndiotacticity exceeding 1.8, a Tg-value exceeding 95° C., a high colour characteristic, an excellent heat stability and surprisingly it has been found that the polymer contains monovalent sulphonic end groups in the proportion of at least one per chain. The colour characteristics are measured by means of a General Electric Integrating Spectrophotometer according to the C.I.E. System of representation and measuring of colour. (See Journal of the Optical Society of America 28, 52, 1938 and National Bureau of Standards in "Paper Trade Journal" 103–108, page 38, 1936.)

According to that system the colour is expressed in terms of purity index (PI) and brightness (B), referred to Standard illumination, which is an emission source corresponding to a black body at 6.200° K.

The heat stability or, still better, heat sensitivity is given by the variation of the purity index ($\Delta$PI) and by the brightness variation ($\Delta$B) of the polymer after heating in a forced air oven at 110° C. for one hour. A polyvinyl chloride will, hereinafter, be said to have high colour characteristics when it shows a purity index of at least 97 and a brightness of at least 90; while a polyvinyl chloride will, hereinafter, be said to have an excellent heat stability when it will show a $\Delta$PI (purity index variation) lower than 5 and $\Delta$B (brightness variation) lower than 20.

The most important feature of this invention resides in the presence of at least one alcoholate in the Redox catalyst system containing an organic hydroperoxide and sulphur dioxide. In fact it has been surprisingly found that the presence of an alcoholate, even in traces, radically changes the course of the reaction between the sulphur dioxide and the hydroperoxide in vinyl chloride monomers at a temperature below 0° C., insofar as sulphur dioxide acts as reducing activator of the hydroperoxide, decomposing it immediately with the formation of free radicals which start the low temperature bulk-polymerization of vinyl chloride.

It is known that the sulphur dioxide, at low temperatures, can act as a monomer capable of copolymerizing with vinyl chloride to form a vinyl chloride-sulphur dioxide copolymer which is easily heat-degradable, of low colour quality, very often insoluble in the solvents for highly syndiotactic polyvinyl chloride and, therefore, not suitable to be transformed into fibres. Now, it has been surprisingly found that the proportion of vinyl chloride-sulphur dioxide copolymer decreases as the concentration of sulphur dioxide decreases and as the (RO—)/SO$_2$ molar ratio increases and this proportion is zero when said ratio is about 1, and that when the (RO—)/SO$_2$ molar ratio exceeds 1, the polymerization conversion markedly decreases down to a complete inhibition of the polymerization when said ratio exceeds 2 and the so obtained polymers are free from sulfone groups

With ratios lower than 1, the polymerization conversion gradually decreases and the obtained polymers will show a constantly increasing proportion of sulfone groups, which will confer to the polymers increasingly poor properties.

It has been also found that when the (RO—)/SO$_2$ molar ratio is lower than 0.70, the obtained polymers are not suited to be transformed into fibres, whereas when said ratio exceeds 1.8 the polymerization conversion becomes too low for commercial purposes. Therefore the typical range of said ratio is between 0.70 and 1.8, but best results, as far as polymerization conversion and polymer properties are concerned, are attained when this ratio is comprised between 0.85 and 1.5.

The qualitative and quantitative analyses of the sulfone group

are made by measuring the absorption bands in the infrared spectrum. According to Arnold Weisberger—Technique of Organic Chemistry, vol. IX—Chemical Application of Spectroscopy, page 549, the sulfone group gives absorption bands at 1335–1310 cm.$^{-1}$ and 1160–1130 cm.$^{-1}$. In Table I hereinbelow are reported the conversion and the percentage of sulfone groups

contained in polyvinyl chloride obtained by polymerizing vinyl chloride at —30° C., according to the method of this invention as applied to the continuous stirred reactor polymerization (see Stanley Walas, Reaction Kinetics for Chemical Engineers, McGraw-Hill, 1959, pages 79–100). The polymerization conditions were the following: dwell time 120 min., sulphur dioxide/cumene hydroperoxide molar ratio 2, different molar ratios (RO—)/SO$_2$ as reported in Table I and a constant concentration of cumene hydroperoxide of 0.18% by weight with respect to vinyl chloride. The percentage of sulfone groups

is determined from the ratio between the absorption of the band 1130 cm.$^{-1}$ (A1130) and that of the band 1425 cm.$^{-1}$ (A1425) and between the absorption of the band 1325 cm.$^{-1}$ (A1325) and that of the band 1425 cm.$^{-1}$ (A1425) respectively, wherein 1130 cm.$^{-1}$ and 1325 cm.$^{-1}$ are the typical absorption bands of the sulfone group and 1425 cm.$^{-1}$ band is characteristic of bonding vibration of —CH$_2$— group in the polyvinyl chloride according to Shimanouchi and Tasumi-Bull. Chem. Soc., Japan, 34, 359–365 (1961). When the absorption ratio A1130/A1425 is lower than 0.3 and the absorption ratio A1325/A1425 is lower than 1, it is assumed that sulfone groups are practically absent.

The infrared spectra were registered by a Perkin Elmer IR 125 grating spectro-photometer on pressed disks of polymer dispersed in KBr.

TABLE I

| Ratio (RO—)/SO$_2$ | Conversion percent | Absorption ratio A1130/A1425 | A1325/A1425 |
|---|---|---|---|
| 0.152 | 4.10 | 0.54 | 1.35 |
| 0.446 | 4.68 | 0.48 | 1.21 |
| 0.854 | 8.60 | 0.18 | 0.96 |
| 1 | 10.62 | 0.13 | 0.91 |
| 1.324 | 10.59 | 0.14 | 0.92 |
| 1.55 | 5.51 | 0.18 | 0.96 |
| 1.82 | 3.11 | 0.18 | 0.94 |
| 2 | 0 | | |

The enclosed FIGS. 1, 2, 3, 4 and 5 show the infrared spectrum of a polymer obtained by using a (RO—)/SO$_2$ ratios of respectively 0.152, 0.446; 0.854, 1 and 1.82.

As it can be seen, the presence of sulfone groups is strongly evident in FIGS. 1, 2 and their absence is evident in FIGS. 3, 4 and 5.

The organic hydroperoxide, as used herein, is an organic compound of the formula R—O—O—H, in which R is a linear or branched chain alkyl radical, a cycloalkyl radical, an aryl radical or an alkyl-aryl radical.

Examples of such compounds are the hydroperoxides of methyl, ethyl, n-propyl, tert.butyl, n-butyl, amyl, hexyl, octyl, phenyl-ethyl, phenyl-isobutyl, phenyl-isopropyl. Particularly suitable are the cumene hydroperoxide and tert.butyl-hydroperoxide. It is to be expressly pointed out that, as distinct from the hydroperoxides above, organic peroxides of the general formula R—O—O—R are ineffective in the process of this invention. The concentration of the organic hydroperoxide is not critical and typically, is comprised between 0.01 and 3% by weight with respect to the monomer feed and preferably from 0.01% to 0.4%. The concentration of the sulphur dioxide must be such that the molar ratio sulphur dioxide/organic hydroperoxide is comprised between 1:15 and 15:1, but preferably between 0.5:1 and 10:1. Practically it is preferred that the quantity of sulphur dioxide is not greater than 3% by weight with respect to the monomeric system, because a quantity exceeding 3% involves a higher polymerization rate which in the bulk-polymerization give rise to remarkable drawbacks of exchange of the polymerization heat. The alcoholates having the formula (R—O)$_n$Me, wherein R is an alkyl radical with a linear or branched chain having from 1 to 6 carbon atoms, Me is a metal of the first or second group of the Periodic System or aluminimum and $n$ may be 1, 2 or 3 depending on the valency of Me, include: methylates, ethylates, propylates, tert.butylates, n-butylates, n-amylates, tert.-amylates and the like of sodium, potassium, lithium, magnesium, calcium, zinc and aluminium.

The short chain alcoholates, from 1 to 3 carbon atoms, are preferred for solubility reasons, and among these the alcoholates obtained by direct reaction between alcohol and alkaline or alkaline earth metals are particularly preferred for reasons of economy and ease of preparation. It has also been found that the metal linked with the alkoxy group influences the colour and the heat stability of the colour of the polymer obtained. From this point of view the alkaline earth metal and aluminium are preferred.

The proportion of the alcoholates in the reaction mixture lies between 0.01% and 5% by weight referred to the monomeric system. Proportions between 0.03 and 1% are preferred.

The alcoholates may be added to the reaction mixture either in pure form or, still better, dissolved in non-reactive organic solvents.

The best solvents of alcoholates are aliphatic alcohols having from 1 to 5 carbon atoms and among these methyl alcohol and ethyl alcohol are preferred. It has been found that the solubility of alcoholates in the conventional solvents increases when sulphur dioxide is dissolved together with them. In this case it is possible to use poor or non solvents for the alcoholates, such as aliphatic nitriles, e.g. acetonitrile; aliphatic chloro derivatives, e.g. dichloroethane or tetrachloroethane; esters e.g. methyl or ethyl acetate; tetrahydrofuran etc. The nature and the quantity of such solvents have no influence on the polymerization course.

Practically, for economic reasons, concentrated solutions of alcoholates are preferred.

The organic solvents, preferably, have to be anhydrous in order to avoid the hydrolysis of the alcoholates.

The alcoholate solution is preferably prepared by dissolving the alcoholate in the solvent containing the desired amount of sulphur dioxide. In this way it is possible to obtain very concentrated alcoholate solutions, with considerable saving in solvent.

The polymerization temperature is below 0° C. and particularly comprised between —10° and —70° C. Such a temperature of the reaction mixture is controlled by conventional means, such as, e.g. dipping the reactor in a thermostatic bath containing cooled trichloroethylene or cooled acetone.

By the term bulk-polymerization, as used herein, it must be understood not only the polymerization carried out by the catalytic system in the undiluted monomer, but also in the presence of minor amount of non-reacting organic compounds, liquid at the polymerization temperature, having a diluting action on the polymerization slurry, to render the latter more free under agitation and to facilitate the heat transfer through the reaction vessel. The following substances are suitable as diluting agents: saturated aliphatic hydrocarbons, aryl hydrocarbons, cycloalkyl hydrocarbons, saturated halogenated hydrocarbons etc. Among these compounds, halogenated saturated hydrocarbons such as ethyl chloride, methyl chloride, dichloroethane, are preferred.

A further advantage of this invention lies in that, by the catalytic system used in this invention, it is possible to obtain very high polymerization conversion also in the absence of diluting agents without accruing an undesired thickening in the polymerization mass.

It is advisable to conduct the polymerization in the absence of oxygen which has an inhibiting effect on the polymerization. In general, for this purpose suitable inert gases, such as nitrogen or carbon dioxide, are used to displace the air from the polymerization reactor.

The process of this invention can be carried out, in practice, in continuous, semi-continuous or batchwise mode of operation. In each case, sulphur dioxide and organic hydroperoxide are kept separated from each other until their introduction into the monomeric system in the reactor. The alcoholate can be fed either together with the sulphur dioxide or alone. As just said, it is preferred, however, to feed the alcoholate together with the sulphur dioxide in solution in a non-reactive solvent. The polymerization can be short-stopped at the desired level, that is at desired monomer conversion and molecular weight, either by known radical inhibitors such as, for example, molecular oxygen, quinone and the like, or by adding an acid for destroying the alcoholate in the catalytic system, the presence of which is essential to the progress of the polymerization, or by adding further amounts of the alcoholate so as to bring (RO—)/SO$_2$ molar ratio to a value exceeding 2, or by discharging the polymerization slurry into an aqueous alkaline solution having a pH value of 9–12.

The polyvinyl chloride, obtained according to the process of this invention, besides being highly syndiotactic, that is, exhibiting a degree of syndiotacticity exceeding 1.8 and a Tg-value exceeding 95° C., has a high colour characteristic that is a PI of at least 97 and a B of at least 90, an excellent heat-stability, that is a ΔPI lower than 5 and a ΔB lower than 20, and, surprisingly, it has been found, by qualitative and quantitative analysis, that the polymer contains at least one monovalent sulphonic end group per polymer chain.

From this chemical evidence it has to be deduced that the catalytic system generates sulphonic radicals that are the chain initiators. The growing radical having a sulphonic end group as chain initiator can terminate according to three different mechanisms: disproportionation, transfer or recombination. In the first two cases the polymer chain will have one sulphonic end group only, while in the third case the polymer chain will have two sulphonic end groups. From this recognition it comes out clearly that in the polymer the sulphonic groups are only at the end of the polymer chain.

Therefore, the quantity of sulphonic groups is correlated with the molecular weight of the polymer, such as, for instance, in a polymer having a number average molecular weight of 50,000, the quantity of milliequivalent monovalent sulphonic groups must be between 20 and 40.

For these particular characteristics, such polyvinyl chloride is particularly suitable to be transformed into fibres. In this case the polymerization conditions have to be arranged in order to obtain a polymer showing a number average molecular weight comprised between 30,000 and 120,000. Moreover the presence of sulphonic groups imparts to the polymers as well as to the shaped articles obtained therefrom, such as fibres, films, etc. the capability to react, by ionic-type reaction, with cation-active compounds such as, for instance antistatic agents, basic dyes etc.

This highly syndiotactic polyvinyl chloride having sulphonic end groups differs from copolymers of vinyl chloride and ethylenically unsaturated comonomers containing the sulphonic group, in as much as the sulphonic group ($-SO_3H$) is situated at the chain end and, therefore, does not introduce any extraneous monomeric units along the polymer chain.

This highly syndiotactic polyvinyl chloride having sulphonic end groups presents, therefore, the great advantage with respect to the vinyl chloride copolymers containing said sulphonated comonomers and obtained at low temperature polymerization in that it does not contain any heterogeneity or structural variation along the polymeric chain. In fact it is known that the particular characteristics of the polyvinyl chloride obtained at low temperature, are due to the possibility that its polymeric chains arrange themselves in a crystalline lattice. The sulphonated comonomers would introduced molecular structures in the polymeric chain that are incompatible with the crystalline lattice dimensions.

Therefore the crystallinity of the system strongly decreases or becomes null, and consequently the physical properties of the polymer are reduced. The sulphonic-groups ($-SO_3H$) differentiate from the sulphone groups

because the former give all the reactions of the strong acids while the sulfone groups do not. Therefore, the sulphonic groups can be determined quantitatively by means of potentiometric titration. Using as a reference what is described in the "Society of Dyers and Colourists, 80, page 577, 1964," a method is developed in order to determine the number of sulphonic end group contained in this particular polyvinyl chloride.

According to this method, a solution containing 1% by weight of the polymer in cyclohexanone is precooled through an ion exchange resin column containing two equal and separate amounts of Amberlite IR 120 (cationic resin) at the top and of Amberlite IR 410 (anionic resin) at the bottom. In this manner it is possible to eliminate all the acids and inorganic salts coming out from the polymer or solvent and to substitute the possible cations bonded to the sulphonic groups with hydrogen ions, in order to make all the sulphonic groups titrable.

The height of the column is 50 cm. and the internal diameter is 1.9 cm. The titration of the acid sulphonic groups in the polymer is directly carried out in the cyclohexanone solution, after ion exchange, by means of methanol solution of a quaternary ammonium base.

The titration is carried out potentiometrically by means of an indifferent electrode e.g. platinum. The results of the acidity titration are expressed as milliequivalents of monovalent sulphonic groups per kg. of dry polymer. (One milliequivalent corresponds to 0.032 g. of elemental sulphur.) The micro analysis of this polyvinyl chloride shows the presence of carbon, hydrogen, chlorine and sulphur and it is found that the quantitative figure of the sulphur per kg. of polymer is equal to the value determined as sulphonic monovalent group via potentiometric analysis.

It is understood that the catalytic system and process of this invention can be as well as applied to the copolymerization of vinyl chloride with up to 50% by weight of ethylenically unsaturated monomers copolymerizable with vinyl chloride. The only difference with respect to the process described above, is that the starting monomers are an admixture of vinyl chloride and one or more other copolymerizable ethylenically unsaturated monomers. By the term "ethylenically unsaturated monomers" have to be understood the organic compounds containing the group C=C. Examples of these compounds are: vinylidene or vinyl compounds, such as vinylidene chloride or fluoride, vinyl fluoride; vinyl esters of carboxylic aliphatic acids containing from 2 to 18 carbon atoms, such as for instance, the vinyl esters of the acetic acid, or the propionic acid, etc.; the acrylic-type monomers, such as acrylic acid, methacrylic acid or their derivatives, as for instance, acrylonitrile, acrylate or methacrylate of aliphatic alcohols containing from 2 to 12 carbon atoms.

In order to further illustrate this invention, but without being limited thereto, the following examples are given:

EXAMPLE I

Into a 2 litre glass polymerization reactor fitted with a stirrer, a cooling system and a thermometer, were continuously fed in:

vinyl chloride,
cumene hydroperoxide,
sulphur dioxide,
an alcoholate of the type recorded on the following Table II, in alcoholic solution.

The fed in quantity of such compounds are reported in Table II. The polymerization reactor was strictly kept at a temperature of −30° C. by means of a thermostatic bath.

From an overflow pipe the suspension of the polymer thus obtained was discharged and filtered. The polymer thus obtained was washed with methanol and with ethyl ether.

On table II are recorded:

The quantity of fed-in vinyl chloride, in g./hr.,
The quantity of fed-in cumene hydroperoxide, in g./hr.,
The quantity of fed-in $SO_2$ in g./hr.,
Dwell time (DT), expressed by the ratio between the volume of the reactor in which the polymerization is carried out and the volume feed rate of the monomers,
The intrinsic viscosity ($\eta$) of the polymer obtained, determined in cyclohexanone at 30° C. and expressed in dl./g. By the intrinsic viscosity it is possible to determine the number average molecular weight M according to the formula: $(\eta)=2.4\times 10^{-4}\times M^{0.77}$ (see J. Pol. Sci. 41, 73, 1959). This formula, however, is only an approximate one.
The colour of the polymer expressed in terms of purity index (PI) and brightness (B).
Heat sensitivity, expressed by the variation of the purity index ($\Delta IP$) and by the brightness variation ($\Delta B$) of the polymer after heating in a forced air oven at 110° C. for one hour.
Syndiotacticity degree
Tg-value
Monovalent sulphonic groups (MSG) expressed in milliequivalent for kg. of dry polymer, determined by potentiometric titration
Sulphur (S) in grams for kg. of dry polymer.

TABLE II

| Tests | Vinyl chloride in g./hr. | Cumene hydroperoxide in g./hr. | $SO_2$ in g./hr. | Molar ratio $SO_2$/cumene hydroperoxide | Alcoholate Type | Alcoholate Quantity in g./hr. | Alcoholate Solvent | Solution conc., percent | DT in min. | Molar ratio $(RO-)/SO_2$ | Conversion, percent | $[\eta]$ | Color PI | Color B | Heat Sensitivity %PI | Heat Sensitivity %B | Tg value, °C. | Syndio-tacticity degree | MSG in meq./kg. of polymer | S in gr./kg. of polymer |
|---|---|---|---|---|---|---|---|---|---|---|---|---|---|---|---|---|---|---|---|---|
| 1 | 400 | 0.6 | 0.25 | 1 |  |  |  |  | 300 |  | 0 |  |  |  |  |  |  |  |  |  |
| 2 | 400 | 0.4 | 0.84 | 5 |  |  |  |  | 300 |  | 0 |  |  |  |  |  |  |  |  |  |
| 3 | 1,000 | 1.81 | 1.53 | 2 | Magnesium methylate | 0.156 | Methanol | 10 | 120 | 0.157 | 4.10 | 1.17 | 95 | 75.2 | 8.1 | 23.7 |  |  | 30.8 | 10.8 |
| 4 | 1,000 | 1.81 | 1.53 | 2 | ----do---- | 0.460 | ----do---- | 10 | 120 | 0.446 | 4.68 | 1.12 | 97.5 | 77.0 | 5.2 | 19.1 | 105 | 2.1 | 34.5 | 9.0 |
| 5 | 1,000 | 1.81 | 1.53 | 2 | ----do---- | 0.88 | ----do---- | 10 | 120 | 0.85 | 8.60 | 1.33 | 98.7 | 92.4 | 3.3 | 10.3 | 105 | 2.1 | 28.0 | 1.1 |
| 6 | 1,000 | 1.81 | 1.53 | 2 | ----do---- | 1.03 | ----do---- | 10 | 120 | 1 | 10.62 | 1.00 | 98.9 | 93.2 | 3.3 | 11.3 | 106 | 2.1 | 39.0 | 1.22 |
| 7 | 1,000 | 1.81 | 1.53 | 2 | ----do---- | 1.37 | ----do---- | 10 | 120 | 1.324 | 10.59 | 0.96 | 99.6 | 92.5 | 3.2 | 11.5 | 105 | 2.1 | 43.5 | 1.35 |
| 8 | 1,000 | 1.81 | 1.53 | 2 | ----do---- | 1.60 | ----do---- | 10 | 120 | 1.55 | 5.51 | 0.92 | 98.6 | 92.8 | 4.2 | 15.1 | 105 | 2.08 | 42.8 | 1.35 |
| 9 | 1,000 | 1.81 | 1.53 | 2 | ----do---- | 1.87 | ----do---- | 10 | 120 | 1.82 | 3.11 | 0.89 | 97.3 | 91.7 | 3.3 | 14.1 | 106 | 2.1 | 44.2 | 1.36 |
| 10 | 400 | 0.3 | 0.63 | 5 | ----do---- | 0.60 | ----do---- | 8 | 300 | 0.91 | 19.5 | 1.55 | 97.5 | 91 | 3.4 | 15.5 |  | 2.15 | 22.7 | 0.70 |
| 11 | 400 | 0.4 | 0.84 | 5 | Sodium ethylate | 0.8 | ----do---- | 8 | 300 | 1.13 | 21.5 | 1.65 | 98 | 93.1 | 3.0 | 12.1 | 106 | 2.2 | 19.8 | 0.62 |
| 12 | 1,000 | 1.81 | 1.53 | 2 | Sodium methylate | 1.03 | ----do---- | 11 | 120 | 1 | 10.6 | 1.22 | 99.5 | 96.0 | 2.9 | 11.0 | 106 | 2.1 | 31.2 | 0.98 |
| 13 | 1,000 | 1.81 | 1.53 | 2 | Magnesium methylate | 1.37 | ----do---- | 10 | 120 | 1.33 | 10.6 | 1.33 | 99.6 | 96.1 | 3.1 | 10.8 | 105 | 2.05 | 27.0 | 0.85 |
| 14 | 1,000 | 1.45 | 1.53 | 2.5 | Magnesium ethylate | 1.50 | Ethanol | 9 | 120 | 1.10 | 10.1 | 1.42 | 99.7 | 96.1 | 2.7 | 10.9 | 106 | 2.15 | 23.6 | 0.75 |
| 15 | 1,000 | 1.50 | 4.40 | 7 | ----do---- | 4.50 | ----do---- | 12 | 120 | 1.150 | 11.2 | 1.41 | 99.1 | 96.2 | 2.9 | 10.7 | 106 | 2.1 | 23.2 | 0.74 |
| 16 | 500 | 0.9 | 0.765 | 2 | ----do---- | 0.65 | ----do---- | 11 | 240 | 0.95 | 17.2 | 1.42 | 99.7 | 95.9 | 3.0 | 10.5 | 105 | 2.2 | 22.8 | 0.70 |
| 17 | 800 | 1.04 | 1.76 | 4 | Aluminium ethylate | 1.0 | ----do---- | 12 | 150 | 0.70 | 10.5 | 1.39 | 99.8 | 96.2 | 3.1 | 10.9 | 107 | 2.2 | 26.8 | 1.86 |
| 18 | 667 | 1.95 | 4.14 | 5 | Sodium methylate | 3.5 | Methanol | 12.5 | 180 | 1 | 9.0 | 0.75 | 98.5 | 92.5 | 4.2 | 12.0 | 105 | 2.15 | 60.2 | 1.85 |
| 19 | 667 | 1.95 | 4.14 | 5 | ----do---- | 3.5 | ----do---- | 40 | 180 | 1 | 8.9 | 0.75 | 98.1 | 92 | 3.2 | 12.1 | 105 | 2.18 | 59.0 | 1.82 |
| 20 | 285 | 0.414 | 0.870 | 5 | ----do---- | 0.88 | ----do---- | 12.5 | 420 | 1.2 | 14.4 | 1.55 | 97.5 | 91.5 | 3.5 | 13.0 | 105 | 2.1 | 21.3 | 0.68 |
| 21 | 285 | 0.414 | 0.870 | 5 | ----do---- | 0.88 | ----do---- | 40 | 420 | 1.2 | 14.5 | 1.56 | 97.6 | 91 | 3.5 | 13.1 | 105 | 2.15 | 20.9 | 0.67 |

It is evident from the results thus obtained and recorded in enclosed Table II that, when an alcoholate is absent, there is no polymerization (see tests 1 and 2) and furthermore that when the molar ratio $(RO-)/SO_2$ is lower than 0.70 (see tests 3 and 4), substantial quantities of sulphur dioxide are copolymerized as sulphone

units.

The presence of such units is evident from the sulphur quantity per kg. of polymer which is higher than the one corresponding to the monovalent sulphonic groups present therein.

It is to be recognized that when the molar ratio $(RO-)/SO_2$ is 0.70 (see test 17), small quantities of vinyl chloride-sulphur dioxide copolymers are present, which however, do not effect remarkably the properties of the polymer.

EXAMPLE 2

By operating according to Example 1, were fed in continuously 400 g./hr. of vinyl chloride, an organic hydroperoxide and an alcoholate in methanolic solution at 12% by weight.

The polymerization temperature was maintained at −20° C. by a thermostatic bath.

The obtained results are recorded in following Table III.

TABLE III

| Hydroperoxide | Hydroperoxide fed in g./hr. | $SO_2$ in g./hr. | Molar ratio $SO_2$/hydroperoxide | Alcoholate Quantity in g./hr. | Alcoholate Type | Molar ratio $(RO-)/SO_2$ | Conversion in percent | $[\eta]$ | Color PI | Color B | Heat sensitivity $\Delta$PI | Heat sensitivity $\Delta$B | Tg value in °C. | Syndio-tacticity degree | MSG in meq./kg. of polymer | S in gr./kg. of polymer |
|---|---|---|---|---|---|---|---|---|---|---|---|---|---|---|---|---|
| Tert. butyl hydroperoxide | 0.48 | 0.68 | 2 | 1 | Sodium Propylate | 0.93 | 36.0 | 1.33 | 98.5 | 92.3 | 3 | 15 | 99.5 | 2.1 | 25.8 | 0.83 |
| Cumene hydroperoxide | 0.4 | 0.84 | 5 | 1.0 | Sodium methylate | 1.05 | 33.5 | 1.41 | 98.4 | 93.2 | 3.6 | 14.2 | 101 | 2.05 | 23.8 | 0.75 |
| Tert. butyl hydroperoxide | 0.23 | 1.13 | 5 | 1.15 | ----do---- | 1.21 | 31.5 | 1.37 | 98.1 | 92.9 | 3.9 | 13.7 | 102 | 2.08 | 26.0 | 0.83 |
| Do | 0.23 | 1.13 | 5 | 0.51 | Magnesium methylate | 1 | 35.0 | 1.58 | 99.2 | 95.7 | 2.3 | 10.5 | 101 | 2.06 | 20.9 | 0.70 |
| Do | 0.43 | 0.76 | 2.5 | 1.7 | Potassium methylate | 1 | 25.0 | 1.3 | 98.5 | 95.2 | 3.5 | 15 | 101 | 2.2 | 27.3 | 0.88 |
| Cumene hydroperoxide | 1.81 | 1.53 | 2 |  |  |  |  |  |  |  |  |  |  |  |  |  |

EXAMPLE 3

Into a 2 litre glass polymerization reactor provided with a stirrer, a refrigeration system and a thermometer, 360 g./hr. vinyl chloride, 40 g./hr. ethyl chloride, 0.4 g./hr. cumene-hydroperoxide, 0.84 g./hr. sulphur dioxide and 1 g./hr. sodium ethylate, are continuously fed in.

The polymerization reactor is maintained strictly at −40° C. in a thermostatic bath.

The suspension of polymer thus obtained is continuously discharged through an overflow pipe. The obtained polymer is then recovered by centrifugation and dried. The polymerization conversion amounts to 14.9% (corresponding to an hourly conversion of 2.98%).

The obtained polymer showed the following characteristics:

Intrinsic viscosity—1.35 dl./g.
Colour:
    PI—97.5
    B—93
Heat sensitivity:
    PI—3.5
    B—13
Syndiotacticity degree—2.1
Tg-value—107° C.
MSG (in milliequivalents per kg. of dry polymer)—25.2
Sulphur (g. per kg. dry polymer)—0.80

EXAMPLE 4

By operating according to Example 1, the following substances were fed in:

| | G./hr. |
|---|---|
| Vinyl chloride | 800 |
| Tertiary-butyl hydroperoxide | 0.96 |
| Sulphur dioxide (methyl alcohol solution at 12% by weight) | 1.2 |
| Magnesium ethylate (methyl alcohol solution at 10% by weight) | 1.072 |

The sulphur dioxide and the magnesium ethylate were fed in together.

The temperature of polymerization was strictly maintained at −30° C. by means of a thermostatic bath.

The polymerization conversion amounted to 10% and the obtained polymer showed the following characteristics:

Intrinsic viscosity—1.40 dl./g.
Colour:
    PI—99.5
    B—95.9
Heat sensitivity:
    $\Delta$PI—2.9
    $\Delta$B—10.7
Syndiotactic degree—2.05
Tg-value—103° C.
MSG (in milliequivalents per kg. dry poylmer)—25.0
Sulphur (g. per kg. of dry polymer)—0.8

Similar results were obtained when substituting the methyl alcohol, as solvent, with ethyl alcohol, acetonitrile or tetrahydrofuran.

EXAMPLE 5

Also here one proceeds according to Example 1, by continuously feeding in

| | G./hr. |
|---|---|
| Vinyl chloride | 800 |
| Tertiary-butyl hydroperoxide | 1.2 |
| Sulphur dioxide | 1.2 |
| Magnesium methylate in methanolic solution having a concentration of 13% B.W. | 1.096 |

The polymerization reactor was maintained strictly at −40° C. by means of a thermostatic bath. The polymerization conversion amounted to 9.2% and the polymer obtained showed the following characteristics:

Intrinsic viscosity—1.32 dl./gr.
Colour:
    PI—99.8
    B—96.3
Heat sensitivity:
    $\Delta$PI—2.8
    $\Delta$B—10.1
Syndiotacticity degree—2.30
Tg-value—104° C.
MSG (in milliequivalent per kg. dry polymer—27.4
S (in g. per kg. dry polymer)—0.88

EXAMPLE 6

It was operated according to Example 1, by continuously feeding in:

| | G./hr. |
|---|---|
| Vinyl chloride | 800 |
| Ethyl chloride | 200 |
| Cumene hydroperoxide | 1.5 |
| Sulphur dioxide (ethyl alcohol solution at 15% by weight) | 1.5 |
| Magnesium ethylate (ethyl alcohol solution at 10% by weight) | 1 |

The sulphur dioxide and the magnesium ethylate were fed in together.

The polymerization temperature was continuously maintained at −20° C. by means of a thermostatic bath. The polymerization conversion amounted to 12.3%, and the polymer obtained showed the following characteristics:

Intrinsic viscosity—1.52 dl./gr.
Colour:
    PI—99.5
    B—95.8
Heat sensitivity:
    $\Delta$PI—2.8
    $\Delta$B—10.5
Syndiotacticity degree—1.9
Tg-value—102° C.
MSG (in milliequivalent per kg. dry polymer)—23.0
S (in g. per kg. dry polymer)—0.73

Similar results were obtained by substituting the ethyl alcohol with acetonitrile or tetrahydrofuran.

EXAMPLE 7

Into a 2 litre polymerization reactor containing 2000 gr. of vinyl chloride pre-cooled at −15° C. and maintained at this temperature by a thermostatic bath, during 2 hours the following substances were fed in:

| | G. |
|---|---|
| Cumene hydroperoxide | 3 |
| Sulphur dioxide | 3 |
| and Magnesium methylate | 2 |

After the feeding in was completed, the reactor was cooled and kept under stirring in an atmosphere of nitrogen for 1 hour. Thereupon the reaction mass was discharged and the polymer was recovered by filtration. The polymer thus obtained was then washed with methyl alcohol and then dried in an oven at 50° C. under vacuum for 12 hours.

360 gr. polyvinyl chloride (conversion 13%) were thus obtained which showed the following characteristics:

Intrinsic viscosity—1.3 dl./gr.
Colour:
    PI—99.7
    B—96.1
Heat sensitivity:
    $\Delta$PI—2.5
    $\Delta$B—11.5

Syndiotacticity degree—1.82
Tg-value—100° C.
MSG (in milliequivalent per kg. of dry polymer)—27.8
S in grams per kg. of dry polymer—0.9

When the test was repeated by operating at a temperature of 45° C., the following results were obtained:

Conversion—9.5%
Intrinsic viscosity—1.15 dl./g.
Colour:
    PI—99.9
    B—96.9
Heat sensitivity:
    ΔPI—2.1
    ΔB—11.8
Syndiotacticity degree—2.41
Tg-value—108° C.
MSG (in milliequivalent per kg. dry polymer)—32.8
S (in grams per kg. of dry polymer)—1.05

EXAMPLE 8

One proceeded according to Example 7, by feeding during 2 hours into 2000 g. vinyl chloride maintained at −20° C.

|  | G. |
|---|---|
| Cumene hydroperoxide | 3 |
| Sulphur dioxide | 3 |
| Zinc ethylate | 3.5 |
| Polymer (conversion 11%) were thereby obtained | 220 |

EXAMPLE 9

Into a polymerization glass reactor fitted with a stirrer, a cooling system and a thermometer, were fed in continuously:

Vinyl chloride,
0.145%, by weight with respect to the monomer, of cumene hydroperoxide,
0.153%, by weight with respect to the monomer, of sulphur dioxide and
0.103%, by weight with respect to the monomer, of magnesium methylate.

The quantities of sulphur dioxide and magnesium methylate were fed in together dissolved in a solvent at concentrations reported in Table IV following.

The molar ratio $SO_2$/cumene hydroperoxide was 2.5 and molar ratio (RO—)/$SO_2$ was 1.

The polymerization temperature was −30° C. and was maintained at this value by means of a thermostatic bath. The dwell time was 120 minutes.

On Table IV are recorded:

The type of solvent used,
Concentrations of $SO_2$ and magnesium methylate in their solution,
Conversion in percent,
Intrinsic viscosity of the obtained polymer,
Syndiotacticity degree,
Tg-value,
MSG (in milliequivalent per kg. dry polymer),
Sulphur (in g. per kg. dry polymer).

TABLE IV

| Solvent | Concentration of $SO_2$, percent | Concentration of magnesium alcoholate in percent by weight | Conversion in percent | Intrinsic viscosity, dl./g. | Tg-value, ° C. | Syndiotacticity degree | MSG | Sulphur in g. per kg. of dry polymer |
|---|---|---|---|---|---|---|---|---|
| Acetonitrile | 7.3 | 4.9 | 9.1 | 1.07 | 105 | 2.1 | 36.5 | 1.142 |
| Dichloroethane | 9.6 | 6.5 | 8.9 | 1.02 | 106 | 2.05 | 39.5 | 1.232 |
| Methyl acetate | 29.8 | 20 | 9.0 | .05 | 104 | 2.2 | 38.0 | 1.187 |
| Tetrahydrofuran | 31.2 | 21 | 8.7 | 1.05 | 105 | 2.1 | 38.0 | 1.187 |

EXAMPLE 10

The same process as described in Example 1 was followed by continouusly feeding into the reactor:

Vinyl chloride,
20%, by weight with respect to the monomer, of ethyl chloride,
3.0%, by weight with respect to the monomer, of cumene hydroperoxide,
1.27%, by weight with respect to the monomer, of sulphur dioxide,
0.854%, by weight with respect to the monomer, of magnesium methylate in methanolic solution at 12% B.W.

The polymerization temperature was −40° C., and dwell time was 90 minutes. The molar ratio $SO_2$/cumene hydroperoxide was 1, and the molar ratio (RO—)/$SO_2$ was 1. The polymerization conversion was 9.5%.

The obtained polymer exhibited the following characteristics:

Intrinsic viscosity—0.8 dl./g.
Syndiotacticity degree—2.30
Tg-value—107° C.
MSG in millequivalent per kg of dry polymer—52.7
Colour:
    PI—98
    B—92
Heat Sensitivity:
    ΔPI—3
    ΔB—13

EXAMPLE 11

By operating according to Example 9, the following compounds were continuously fed into a polymerization reactor:

Vinyl chloride,
20%, by weight with respect to the monomer, of ethyl chloride,
2.53%, by weight with respect to the monomer, of cumene hydroperoxide,
2.7%, by weight, of sulphur dioxide,
1.82%, by weight, of magnesium methylate in methanolic solution at 12% by weight.

The molar ratio $SO_2$/cumene hydroperoxide was 2.5 and that of (RO—)/$SO_2$ was 1. The dwell time was of 30 minutes and the polymerization temperature was −40° C.

The polymerization conversion was 12.0% and the obtained polymer exhibited the following characteristics:

Intrinsic viscosity—0.86 dl./g.
Syndiotacticity degree—2.3
Tg-value—109° C.
Sulphur (in gr. per kg. of dry polymer)—1.525
MSG (in milliequivalent per kg. of dry polymer)—48.8
Colour:
    PI—97.5
    B—91.5
Heat sensitivity:
    ΔPI—4.5
    ΔB—15

EXAMPLE 12

By operating according to Example 9, the following compounds were continuously fed into a polymerization reactor:

Vinyl chloride,
0.01%, by weight of cumene hydroperoxide,
0.022%, by weight of sulphur dioxide,
0.0148%, by weight of magnesium methylate in methanolic solution at 12% by weight.

The molar ratio $SO_2$/cumene hydroperoxide was 5, and that of (RO—)/$SO_2$ was 1. The dwell time was of 480 minutes and the polymerization temperature of −20°

C. The polymerization conversion was 2.5 and the obtained polymer exhibited the following characteristics:

Intrinsic viscosity—0.90 dl./g.
Syndiotacticity degree—1.85
Tg-value—102° C.
Sulphur (in gr. per kg. of dry polymer)—1.41
MSG (in milliequivalent per kg. of dry polymer)—45.5
Colour:
    PI—99
    B—94
Heat sensitivity:
    ΔPI—2.5
    ΔB—11

EXAMPLE 13

By operating according to Example 1, was fed into a glass polymerization reactor having the capacity of 2690 cc., the following compounds:

| | G./hr. |
|---|---|
| Vinyl chloride | 1345 |
| Methyl acrylate | 13.45 |
| Cumene hydroperoxide | 1.345 |
| Sulphur dioxide | 1.412 |
| Magnesium methylate in methanolic solution at 12% by weight | 0.948 |

The polymerization temperature was −30° C.
The polymerization conversion was 8.50%.
The copolymer, thus obtained, contained a copolymerized methyl acrylate proportion of 7.0% by weight and had an intrinsic viscosity of 1.20 dl./g.

By doubling the quantity of the methyl-acrylate, the obtained copolymer had a content of methyl-acrylate of 13% by weight.

EXAMPLE 14

The Example 12 was repeated by feeding, as monomers, −1345 gr./hr. of vinyl chloride and 40.35 g./hr. of vinyl acetate. The polymerization conversion was of 3.00%. The obtained copolymer had a proportion of copolymerized vinyl acetate of 3% by weight and exhibited an intrinsic viscosity of 1.00 dl./g.

EXAMPLE 15

0.150 gr. of cumene hydroperoxide, 0.158 gr. of sulphur dioxide and 0.101 g. of magnesium methylate in methanolic solution at 12%, were added in 1 hour and under agitation to an admixture of 98 g. of vinyl chloride and 2 g. of methyl-acrylate maintained at −30° C. The temperature was strictly maintained at this value by means of a thermostatic bath.

The polymerization started immediately and the formed polymer progressively precipitated. The agitation was stopped after about 2 hr. and the copolymer separated by pouring the reaction mass into an aqueous solution of NaOH at pH of 10.6 g. of copolymer were obtained having a content of copolymerized methylacrylate of 13% and exhibited an intrinsic viscosity of 1 dl./g. Its contents of sulphur milliequivalent in the form of monovalent sulphonic groups per kg. of dry copolymer was 39.2.

What we claim is:
1. A process for bulk-polymerizing vinyl chloride at a temperature below 0° C. and down to about −70° C., characterized in that the polymerization is conducted in the presence of a catalytic system comprised of (a) an organic hydroperoxide, (b) sulphur dioxide, said sulphur dioxide being present in a concentration such that the molar ratio sulphur dioxide/organic hydroperoxide is between 1:15 and 15:1, and (c) at least one alcoholate of the formula $(R-O)_n Me$ wherein R is a linear or branched chain alkyl radical having from 1 to 6 carbon atoms, Me is a Group I or Group II metal of the Periodic Table, or aluminum, and $n$ is an integer corresponding to the valence of Me, and further wherein the molar ratio $(RO-)/SO_2$ does not exceed 2.

2. The process as defined by claim 1, wherein the alcoholate has from 1 to 3 carbon atoms.

3. The process as defined by claim 1, wherein Me is selected from the group consisting of a Group II metal of the Periodic Table or aluminum.

4. The process as defined by claim 1, wherein the molar ratio $(RO-)/SO_2$ ranges from between 0.70 and 1.8.

5. The process as defined by claim 1, wherein the molar ratio $(RO-)/SO_2$ ranges from between 0.85 and 1.5.

6. The process as defined by claim 1, wherein the organic hydroperoxide is selected from the group consisting of cumene hydroperoxide and tert-butyl-hydroperoxide.

7. The process as defined by claim 1, wherein the polymerization is conducted in the presence of an inert diluent.

8. The process as defined by claim 1, wherein the vinyl chloride is copolymerized with up to 50% of at least one other ethylenically unsaturated monomer copolymerizable therewith.

9. The process as defined by claim 1, wherein the alcoholate is introduced to the reaction mass as a solution in an aliphatic alcohol having from 1 to 5 carbon atoms.

10. The process as defined by claim 1, wherein the alcoholate is introduced to the reaction mass, together with the sulphur dioxide, as a solution in a solvent selected from the group consisting of aliphatic alcohols having from 1 to 5 carbon atoms, aliphatic nitriles, aliphatic chlorocarbons, esters and tetrahydrofuran.

11. The process as defined by claim 1, wherein the concentration of sulphur dioxide does not exceed 3% by weight based on weight monomer; wherein the concentration of the organic hydroperoxide ranges from between about 0.01 and 3% by weight based on weight monomer; and wherein the concentration of the alcoholate ranges from between about 0.01 and 5% by weight based on weight monomer.

12. The process as defined by claim 1, wherein the molar ratio sulphur dioxide/organic hydroperoxide is between 0.5:1 and 10:1; wherein the concentration of the organic hydroperoxide ranges from between about 0.01 and 0.4% by weight based on weight monomer; and wherein the concentration of the alcoholate ranges from between about 0.03 and 1% by weight based on weight monomer.

References Cited
UNITED STATES PATENTS

| | | | |
|---|---|---|---|
| 3,255,164 | 6/1966 | Visger et al. | 260—86.3 |
| 3,294,770 | 12/1966 | Ragazzini et al. | 260—92.8 |
| 3,415,797 | 12/1968 | Borsini et al. | 260—92.8 |
| 3,372,219 | 3/1968 | Gord et al. | 260—92.8 |

JAMES A. SEIDLECK, Primary Examiner

U.S. Cl. X.R.

260—79.3, 85.5, 86.3, 87.1, 87.5, 87.7